(12) United States Patent
Barthe et al.

(10) Patent No.: US 10,103,399 B2
(45) Date of Patent: Oct. 16, 2018

(54) METHOD OF MANUFACTURING A CELL UNIT OF A FUEL CELL

(71) Applicant: Commissariat à l'Energie Atomique et aux Energies Alternatives, Paris (FR)

(72) Inventors: Benoît Barthe, Chindrieux (FR); Rèmi Vincent, Grenoble (FR)

(73) Assignee: COMMISSARIAT A L'ENERGIE ATOMIQUE ET AUX ENERGIES ALTERNATIVES, Paris (FR)

( * ) Notice: Subject to any disclaimer, the term of this patent is extended or adjusted under 35 U.S.C. 154(b) by 266 days.

(21) Appl. No.: 14/936,832

(22) Filed: Nov. 10, 2015

(65) Prior Publication Data

US 2016/0133976 A1  May 12, 2016

(30) Foreign Application Priority Data

Nov. 12, 2014  (FR) ...................... 14 60894

(51) Int. Cl.
*H01M 8/1004* (2016.01)
*H01M 8/0273* (2016.01)

(52) U.S. Cl.
CPC ....... *H01M 8/1004* (2013.01); *H01M 8/0273* (2013.01); *Y02P 70/56* (2015.11)

(58) Field of Classification Search
None
See application file for complete search history.

(56) References Cited

U.S. PATENT DOCUMENTS

| 2008/0105354 A1 | 5/2008 | James et al. |
| 2014/0004442 A1 | 1/2014 | Mitsuta et al. |

FOREIGN PATENT DOCUMENTS

| FR | 2992776 A1 | 1/2014 |
| FR | 3001833 A1 | 8/2014 |
| WO | 2013161200 A1 | 10/2013 |
| WO | WO 2014/122186 | * 8/2014 |

OTHER PUBLICATIONS

Preliminary Search Report filed in FR 14/60894 dated Jun. 25, 2015; 2 pages.

* cited by examiner

*Primary Examiner* — Sarah A. Slifka
(74) *Attorney, Agent, or Firm* — Moreno IP Law LLC

(57) ABSTRACT

A method of manufacturing a cell unit of a fuel cell, including: a) forming an assembly including an electrolyte membrane, an anode catalyst layer coated with a gas diffusion electrode on the side of a surface of the membrane, a cathode catalyst layer coated with a second gas diffusion electrode on the side of the other surface of the membrane, a first reinforcement frame at least partly extending between the membrane and the first electrode, and a second reinforcement frame at least partly extending between the membrane and the second electrode; b) fastening the first and second frames on either side of the membrane; and c) performing a local welding of at least one of the first and second frames to the membrane.

13 Claims, 3 Drawing Sheets

METHOD OF MANUFACTURING A CELL UNIT OF A FUEL CELL

This application claims the priority benefit of French Patent application number 14/60894, filed on Nov. 12, 2014, the contents of which is hereby incorporated by reference in its entirety to the maximum extent allowable by law.

BACKGROUND

The present disclosure relates to the field of fuel cells, and more specifically aims at a method of manufacturing a cell unit of a fuel cell. Hydrogen-oxygen fuel cells are here more particularly considered.

DISCUSSION OF THE RELATED ART

A hydrogen-oxygen fuel cell conventionally comprises one or a plurality of elementary cell units each having a stack including an electrolyte membrane, an anode catalyst membrane arranged on the side of a first surface of the membrane, a first gas diffusion electrode arranged on the side of the anode catalyst layer opposite to the membrane, a cathode catalyst layer arranged on the side of a second surface of the membrane opposite to the first surface, and a second gas diffusion electrode arranged on the side of the cathode catalyst layer opposite to the membrane.

In operation, the first electrode or anode electrode is in contact with hydrogen ($H_2$), for example, pure hydrogen, or any other adapted gaseous mixture containing hydrogen, and the second electrode or cathode electrode is in contact with oxygen ($O_2$), for example, pure oxygen, ambient air, or any other adapted gaseous mixture containing oxygen.

In such conditions, when the cell unit is connected to a load, a positive voltage appears between the anode electrode and the cathode electrode of the cell unit, and a current flows through the load. On the anode side, the catalyst transforms gaseous hydrogen molecules into two protons and two electrons. The electrons flow through the load, and the protons displace from the anode catalyst layer, through the electrolyte membrane, to the cathode catalyst layer, where they react with oxygen to form water ($H_2O$).

Generally, a fuel cell comprises a plurality of identical or similar elementary cell units connected in series. In practice, the cell units are stacked so that two neighboring cell units have their surfaces of opposite polarities facing each other. Two neighboring cell units are separated by an electrically-conductive plate, sometimes called bipolar plate, comprising channels enabling to distribute the reactant gases (respectively hydrogen and oxygen) on the surface of the electrodes (respectively the anode of one of the two cell units and the cathode of the other cell unit), and to discharge the water generated by the reaction occurring on the cathode side. The stack formed by the alternation of cell units and of bipolar plates may be maintained in compression between two clamping plates.

A problem which arises in the field of hydrogen-oxygen fuel cells is that of the lifetime of elementary cell units. In particular, the electrolyte membrane is relatively fragile and is submitted to significant mechanical stress since its dimensions, and particularly its thickness, may significantly vary during the cell unit operating cycles, according to the humidity rate and/or to the temperature of the cell unit. Thus, the degradation of cell units is relatively fast, which raises problems of reliability, and also of security. Indeed, in certain degradation cases, for example, in case of a breakage of the electrolyte membrane, the gaseous hydrogen and the gaseous oxygen risk coming into contact within a cell, which might result in igniting the cell unit.

It has already been provided, for example, in patent application US2008/0105354, to arrange, in each cell unit, on either side of the electrolyte membrane, at the level of a peripheral region of the membrane, reinforcement elements enabling to improve the cell robustness and to thus increase the lifetime thereof.

However, the inventors have observed that even with such peripheral reinforcements, the robustness of the elementary cell units remains insufficient for certain applications.

There thus is a need for elementary cell units of a hydrogen-oxygen fuel cell, which are more resistant than existing cell units.

SUMMARY

Thus, an embodiment provides a method of manufacturing a cell unit of a fuel cell, comprising the steps of: a) forming an assembly comprising an electrolyte membrane, an anode catalyst layer on the side of a first surface of the membrane, a first gas diffusion electrode on the side of the anode catalyst layer opposite to the membrane, a cathode catalyst layer on the side of a second surface of the membrane opposite to the first surface, a second gas diffusion electrode on the side of the cathode catalyst layer opposite to the membrane, a first reinforcement frame arranged opposite a peripheral region of the membrane and at least partly extending between the membrane and the first electrode, and a second reinforcement frame arranged opposite the peripheral region of the membrane and at least partly extending between the membrane and the second electrode; b) fastening the first and second reinforcement frames on either side of the membrane; and c) performing a local welding of at least one of the first and second reinforcement frames to or with the membrane.

According to an embodiment, the welding is located in an area located opposite a portion of the peripheral region of the membrane covered with the frame, and which does not extend over the entirety of said peripheral region.

According to an embodiment, the welding is located in an area where, at the end of step b), the membrane is in contact with the frame.

According to an embodiment, the welding is located in an area where, at the end of step b), the membrane and the frame are not covered with an electrode.

According to an embodiment, the welding is located in an area continuously surrounding an active portion of the cell.

According to an embodiment, the welding is located in an area discontinuously surrounding an active portion of the cell.

According to an embodiment, the first and second frames are made of materials having different melting temperatures and, at step c), the local welding is performed on the side of the frame having the lowest melting temperature.

According to an embodiment, step c) comprises a local welding of the first frame to or with the membrane and a local welding of the second frame to or with the membrane.

According to an embodiment, step b) is carried out by hot pressing of the entire cell.

According to an embodiment, the local welding is performed by means of a laser beam.

According to an embodiment, the method further comprises a step of cutting, by means of a laser beam, openings in portions of the first and second frames.

Another embodiment provides a cell unit of a fuel cell comprising an assembly comprising: an electrolyte membrane, an anode catalyst layer on the side of a first surface of the membrane, a first gas diffusion electrode on the side of the anode catalyst layer opposite to the membrane, a cathode catalyst layer on the side of a second surface of the membrane opposite to the first surface, a second gas diffusion electrode on the side of the cathode catalyst layer opposite to the membrane, a first reinforcement frame arranged opposite a peripheral region of the membrane and extending at least partly between the membrane and the first electrode, and a second reinforcement frame arranged opposite the peripheral region of the membrane and at least partly extending between the membrane and the second electrode, the first and second reinforcement frames being fastened on either side of the membrane; and a local welding of at least one of the first and second reinforcement frames to or with the membrane.

According to an embodiment, the local welding continuously surrounds an active portion of the cell unit.

According to an embodiment, the local welding discontinuously surrounds an active portion of the cell unit.

The foregoing and other features and advantages will be discussed in detail in the following non-limiting description of specific embodiments in connection with the accompanying drawings.

DETAILED DESCRIPTION

Figure 1:
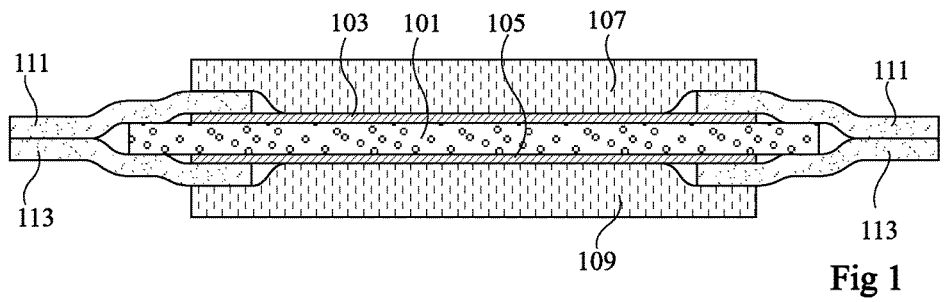
FIGS. 1 and 2 respectively are a cross-section view and a top view schematically showing an example of an elementary cell unit of a fuel cell.

For clarity, the same elements have been designated with the same reference numerals in the various drawings and, further, the various drawings are not to scale. Further, in the present disclosure, unless otherwise indicated, terms "approximately", "substantially", "around", "in the order of", etc. mean "to within 20%", and terms referring to directions, such as "upper", "lower", "topping", "above", "lateral", etc. apply to devices arranged as illustrated in the corresponding views, it being understood that, in practice, the devices may have different directions.

Figure 2:
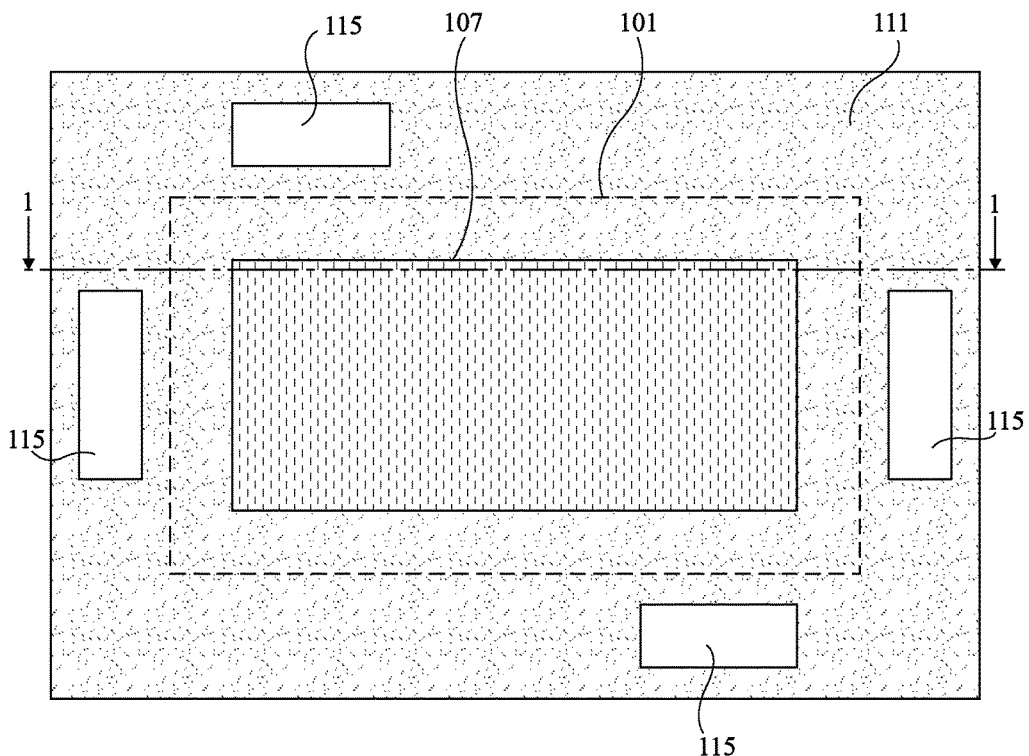

FIGS. 1 and 2 respectively are a cross-section view and a top view schematically showing an example of a cell unit of a fuel cell. FIG. 1 is a cross-section view along plane 1-1 of FIG. 2.

The cell unit of FIGS. 1 and 2 comprises a membrane or electrolyte layer 101. Membrane 101 is a proton-exchange membrane, that is, it allows the passing of protons while being permeable to reactant gases, and particularly to hydrogen and to oxygen, as well as being electrically insulating. Membrane 101 may be made of a polymer material or of an alloy of a plurality of polymer materials. Membrane 101 is for example made of Nafion.

Membrane 101 is at least partially coated, on its upper surface side, with an anode catalyst layer 103 and, on its lower surface side, with a cathode catalyst layer 105. Anode catalyst 103 is for example made of platinum or of a mixture comprising carbon and platinum, and cathode catalyst 105 is for example made of a mixture comprising platinum and cobalt.

Anode catalyst layer 103 is at least partially coated with a gas diffusion electrode 107, or anode electrode, and cathode catalyst layer 105 is at least partially coated with a gas diffusion electrode 109, or cathode electrode. Electrodes 105 and 109 are electrically conductive, and contain openings enabling to distribute the reactant gases respectively on the upper surface of anode catalyst layer 103 and on the lower surface of cathode catalyst layer 105.

The cell unit of FIGS. 1 and 2 further comprises, on the upper surface side of membrane 101, a first reinforcement frame 111 topping a peripheral region of the membrane. In the shown example, on the side of the lateral side of frame 111, a portion of frame 111 is pinched between anode electrode 107 and membrane 101. Further, in the shown example, on the side of the outer lateral edge of frame 111, a portion of frame 111 extends beyond the lateral edge of membrane 101. In this example, electrode 107 has, in top view, a surface area smaller than that of membrane 101. More specifically, in this example, electrode 107 covers the entire upper surface of membrane 101 except for a peripheral strip of membrane 101. Thus, an intermediate portion of frame 111, located between the inner portion (pinched between electrode 107 and membrane 101) and the outer portion (extend beyond the lateral edge of membrane 101) of frame 111, is not topped with electrode 107. Frame 111 is made of a material tight to reactant gases, for example, made of polymer material, for example, polyethylene terephthalate (PET) or polyethylene naphthalate (PEN). Frame 111 should be made from a sheet of a polymer material, having its central portion cut out to only leave a peripheral portion in the form of a ring-shaped strip. In the normal conditions of use of the cell unit, frame 111 is preferably more rigid and less subject to deformations than membrane 101.

The cell unit of FIGS. 1 and 2 further comprises, on the lower surface side of membrane 101, a second reinforcement frame 113 opposite a peripheral region of the membrane. In the shown example, on the side of the inner lateral edge of frame 113, a portion of frame 113 is pinched between cathode electrode 109 and membrane 101. Further, in the shown example, on the side of the lateral edge of frame 113, a portion of frame 113 extends beyond the lateral edge of membrane 101. In this example, electrode 109 has, in top view, a surface area smaller than that of membrane 101. More particularly, in this example, electrode 109 covers the entire lower surface of membrane 101 except for a peripheral strip of membrane 101. As an example, in top view, electrode 109 occupies substantially the same surface area as electrode 107. Thus, an intermediate portion of frame 113, located between the inner portion (pinched between electrode 109 and membrane 101) and the outer portion (extending beyond the lateral edge of membrane 101) of frame 113, is not topped with electrode 109. Reinforcement frame 113 is made of a material tight to reactant gases, for example, made of the same material as reinforcement frame 111.

In this example, the lower surface of the outer portion of frame 111 is in contact with the upper surface of frame 113.

As a variation (not shown), it is possible for frames 111 and 113 not to extend beyond the lateral edge of membrane 101. In this case, frames 111 and 113 are not in contact with each other.

The active portion of the cell unit is formed by the portion of the stack of elements 109, 105, 101, 103, and 107 located, in top view, inside of frames 111 and 113.

As appears in FIG. 2, the assembly formed by reinforcement frames 111 and 113 may comprise openings 115, particularly intended to supply with reactant gases the different cell units of the fuel cell, and of discharging the water produced during the fuel cell operation. Openings 115 are for example located at the level of portions of frames 111 and 113 which are not covered with electrodes 107 and 109.

The cell unit of FIG. 1 may be formed as follows.

Anode catalyst and cathode catalyst layers 103 and 105 are first respectively deposited on the upper and lower surfaces of membrane 101.

Upper and lower reinforcement frames 111 and 113 are then arranged on either side of the stack formed by membrane 101 and catalyst layers 103 and 105, after which electrodes 107 and 109 are respectively arranged on the upper surface side and on the lower surface side of the assembly formed by membrane 101, layers 103 and 105, and frames 111 and 113, according to the above-described arrangement.

The assembly comprising membrane 101, layers 103 and 105, reinforcements 111 and 113, and electrodes 107 and 109, is then hot-pressed, particularly to fasten, in reactant-gas tight manner, reinforcement frames 111 and 113 to or with membrane 101. During this step, the assembly is for example taken to a temperature higher than the vitreous transition temperature of membrane 101. The temperature of the assembly during the pressing should however not be too high, to avoid degrading membrane 101 at the level of the active portion of the cell unit. As a non-limiting example, the hot pressing step is carried out at a temperature in the range from 100 to 200° C., and preferably from 120 to 160° C.

Openings 115 may then be formed by laser cutting in areas where frames 111 and 113 overlap.

As appears in FIG. 1, there results from the above-described method that the inner portion of frame 111 (located between electrode 107 and membrane 101) has its lower surface in contact with the upper surface of catalyst layer 103 and its upper surface in contact with the lower surface of electrode 107, and that the inner portion of frame 113 (located between electrode 109 and membrane 101) has its upper surface in contact with the lower surface of catalyst layer 105 and its lower surface in contact with the upper surface of electrode 109.

In the shown example, in top view, the surface of anode catalyst layer 103 substantially coincides with the surface of electrode 107. The intermediate portion of frame 111 (extending between the lateral edge of electrode 107 and the lateral edge of membrane 101) is in contact with the upper surface of membrane 101. Further, in this example, in top view, the surface of cathode catalyst layer 105 substantially coincides with the surface of electrode 107. Thus the intermediate portion of frame 113 (extending between the lateral edge of electrode 109 and the lateral edge of membrane 101) is in contact with the lower surface of membrane 101.

Figure 3:
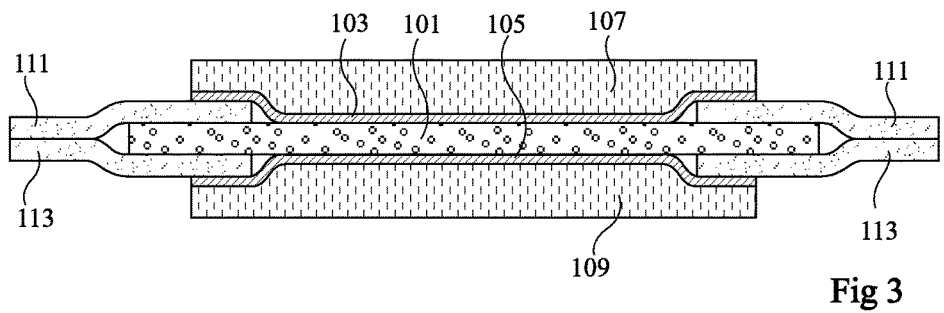
FIG. 3 is a cross-section view schematically showing another example of a cell unit of a fuel cell.

FIG. 3 is a cross-section view schematically showing another example of a cell unit of a fuel cell. The cell unit of FIG. 3 comprises the same elements as the cell unit of FIGS. 1 and 2, and differs from the cell unit of FIGS. 1 and 2 essentially by its manufacturing method.

The cell unit of FIG. 3 is formed as follows.

Anode catalyst and cathode catalyst layers 103 and 105 are successively deposited on the lower surface of electrode 107 and on the upper surface of electrode 109.

Upper and lower reinforcement frames 111 and 113 are arranged on either side of the stack formed by membrane 101, after which electrodes 107 and 109, respectively coated with catalyst layers 103 and 105, are respectively arranged on the upper surface side and on the lower surface side of the assembly formed by membrane 101 and frames 111 and 113, according to the above-described arrangement.

The entire unit cell is then hot-pressed, as in the example of FIGS. 1 and 2, to fasten, reactant-gas tight manner, reinforcement frames 111 and 113 to or with membrane 101.

Openings 115 (not shown in FIG. 3) may then be formed in frames 111 and 113, as in the example of FIGS. 1 and 2.

Thus, the cell unit of FIG. 3 differs from the cell unit of FIGS. 1 and 2 essentially in that, in the example of FIG. 3, the entire portion of frame 111 located opposite membrane 101, and particularly the inner portion of frame 111 (arranged between electrode 107 and membrane 101), has its lower surface in contact with the upper surface of membrane 101 and its upper surface in contact with the lower surface of layer 103, and the entire portion of frame 113 located opposite membrane 101, and particularly the inner portion of frame 113 (arranged between electrode 109 and membrane 101), has its upper surface in contact with the lower surface of membrane 101 and its lower surface in contact with the upper surface of layer 105.

Tests performed by the inventors have shown that despite the presence of peripheral reinforcements 111 and 113, the fuel cell units of the type described in relation with FIGS. 1, 2, and 3 are likely to degrade. In particular, the inventors have observed that after a certain time of use of a cell unit, a delamination may occur in a peripheral region of the cell unit, especially due to the repeated variations of the thickness of membrane 101. In particular, upper reinforcement 111 and/or lower reinforcement 113 may separate from membrane 101. Such a delamination is particularly critical if it results in both a loss of tightness of the fastening between reinforcement 111 and membrane 101, and in a loss of tightness of the fastening between reinforcement 113 and membrane 101. Indeed, in this case, the gaseous hydrogen and the gaseous oxygen supplying the cell on either side of membrane 101 are capable of coming into contact, and there is a risk for the cell unit to ignite.

Figure 4:
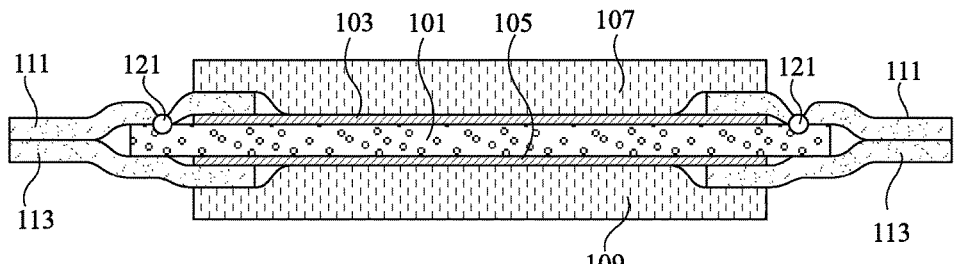
FIGS. 4 and 5 respectively are a cross-section view and a top view of a cell unit of a fuel cell, illustrating an example of an embodiment of a method of manufacturing a cell unit of a fuel cell.
Figure 5:
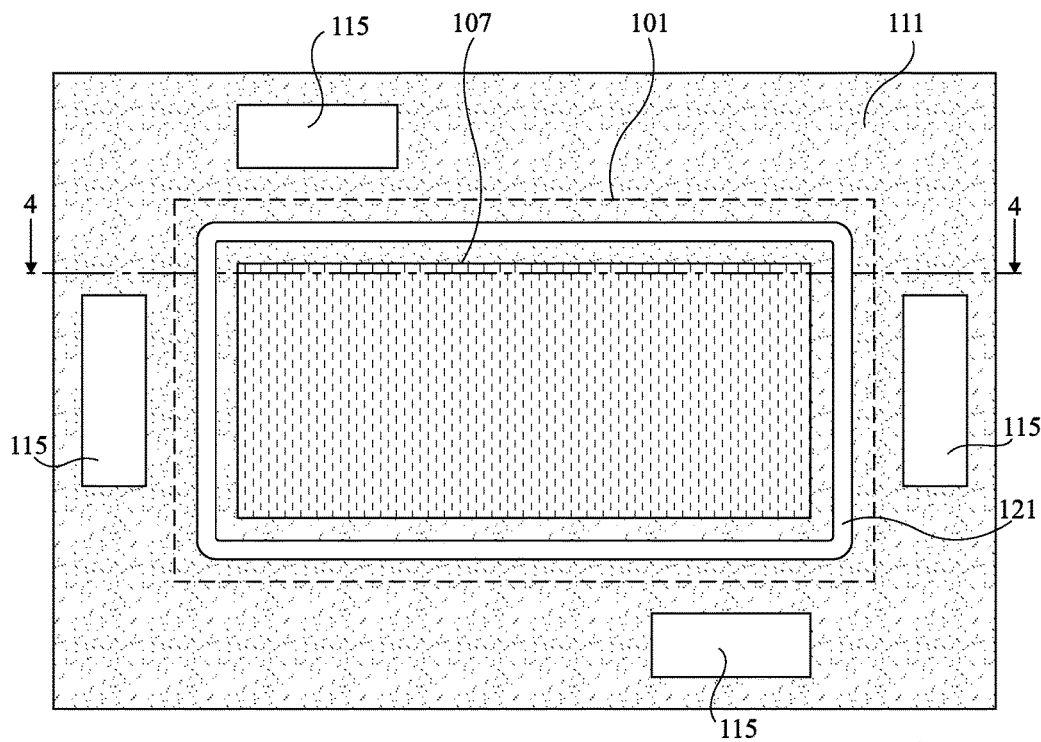

FIGS. 4 and 5 respectively are a cross-section view and a top view of an elementary cell unit of a fuel cell, illustrating an example of an embodiment of a method of manufacturing an elementary cell unit of a fuel cell. FIG. 4 is a cross-section view along plane 4-4 of FIG. 5.

The cell unit of FIGS. 4 and 5 comprises the same elements as the cell unit of FIGS. 1 and 2, and differs from the cell unit of FIGS. 1 and 2 mainly by its manufacturing method.

The manufacturing method of FIGS. 4 and 5 may comprise substantially the same steps as the manufacturing method described in relation with FIGS. 1 and 2 and differs from the manufacturing method of FIGS. 1 and 2 essentially in that it comprises, after the step of tight fastening of reinforcement frames 111 and 113 on membrane 101, an additional step of local welding of reinforcement frame 111 to or with membrane 101, at the level of an area 121 of frame 111.

In top view, area 121 where frame 111 is welded to membrane 101 is located on a portion only of the surface of frame portion 111 overlapping membrane 111. To make the welding operation easier, welding area 121 is preferably located at the level of a portion of frame 111 which is not covered with electrode 107. The described embodiments are however not limited to this specific case. Preferably, local welding area 121 is located on a portion of frame 111 in direct contact with membrane 101.

In the shown example, local welding area 121 has, in top view (FIG. 5), the shape of a continuous frame totally surrounding the active portion of the cell unit.

The local welding may be performed by means of a laser beam which scans area 121. In this case, an advantage is that the same tool may be used to perform the welding and to cut openings 115 in frames 111 and 113. During the welding step, to avoid risking piercing the cell unit, the laser beam may be defocused and/or set to a different power and/or set to a different scan speed than the setting used during the step of cutting openings 115.

More generally, the local welding of frame 111 to membrane 101 may be performed by means of any other heat source enabling to locally heat a portion of the surface of frame 111, for example, by means of a heated metal pattern which is applied to frame 111, of a local hot air flow, of a soldering iron, etc.

An advantage of the manufacturing method of FIGS. 4 and 5 is that the local welding of frame 111 to membrane 101 significantly reinforces the resistance to the cell unit delamination. In particular, the welding being located outside of the active portion of the cell unit, it may, without risking degrading the active portion of the cell, be performed at a temperature greater than the temperature used at the cell unit hot pressing step. As an example, the local welding of frame 111 to membrane 101 may be performed at a temperature in the range from 200 to 400° C. This results in a stronger fastening of frame 111 to membrane 101 than that obtained during the cell unit hot pressing step.

In particular, the tests carried out by the inventors have shown that due to the presence of the local welding of frame 111 to membrane 101, even after a long time of use of the cell unit, frame 111 does not separate from membrane 101, and the fastening between frame 111 and membrane 101 remains tight. Thus, the local welding of frame 111 to membrane 101 avoids or considerably limits the risk of fire by the placing into contact of gaseous hydrogen or oxygen within the cell unit. Indeed, even if frame 113 (which comprises no local welding in this example) happened to separate from membrane 101, the oxygen introduced via cathode electrode 109 would remain isolated from the hydrogen brought to anode electrode 107, by the area of tight fastening of frame 111 to membrane 101.

Figure 6:
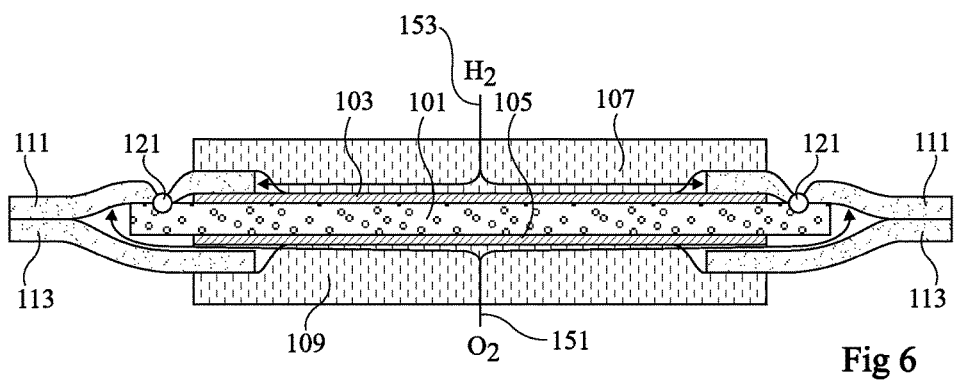
FIG. 6 is a cross-section view of the cell unit of FIGS. 4 and 5 after a relatively long period of use.

This is illustrated in FIG. 6, which shows a cross-section view of the cell unit of FIGS. 4 and 5 after a particularly intense use, having caused a delamination between frame 113 and membrane 101. In FIG. 6, it can be observed that frame 113 is no longer tightly fastened along the entire periphery of the lower surface of membrane 101. As a result, oxygen injected on the cathode side may come into contact with the lower surface of frame 111, outside of the frame formed by local welding area 121. However, due to the presence of local welding area 121, the tightness of the fastening of frame 111 to the upper surface of membrane 101 is preserved. Thus, the gaseous oxygen capable of laterally escaping from the cell, on the cathode side, remains separated from the gaseous oxygen injected on the anode side. This is illustrated by lines 151 and 153 of FIG. 6, which respectively schematically show the gaseous oxygen and gaseous hydrogen flow in the cell.

It should be noted that in the embodiment of FIGS. 4 and 5, local welding area 121 continuously surrounds (in top view) the active portion of the cell unit. Thus, welding 121 has not only the advantage of reinforcing the mechanical resistance of the assembly, on the anode side, thus preventing risks of delamination between frame 111 and membrane 101, but also has the advantage of itself forming a local area where frame 111 is tightly fastened on or with membrane 101, which prevents the placing into contact of gaseous oxygen and of gaseous hydrogen.

As a variation, instead of performing a local welding of frame 111 to membrane 101, one may, similarly to what has been described hereabove, perform a local welding of frame 113 to or with membrane 101. This enables to substantially obtain the same advantages of increased resistance and security as when the welding is performed on the side of frame 111.

Figure 7:
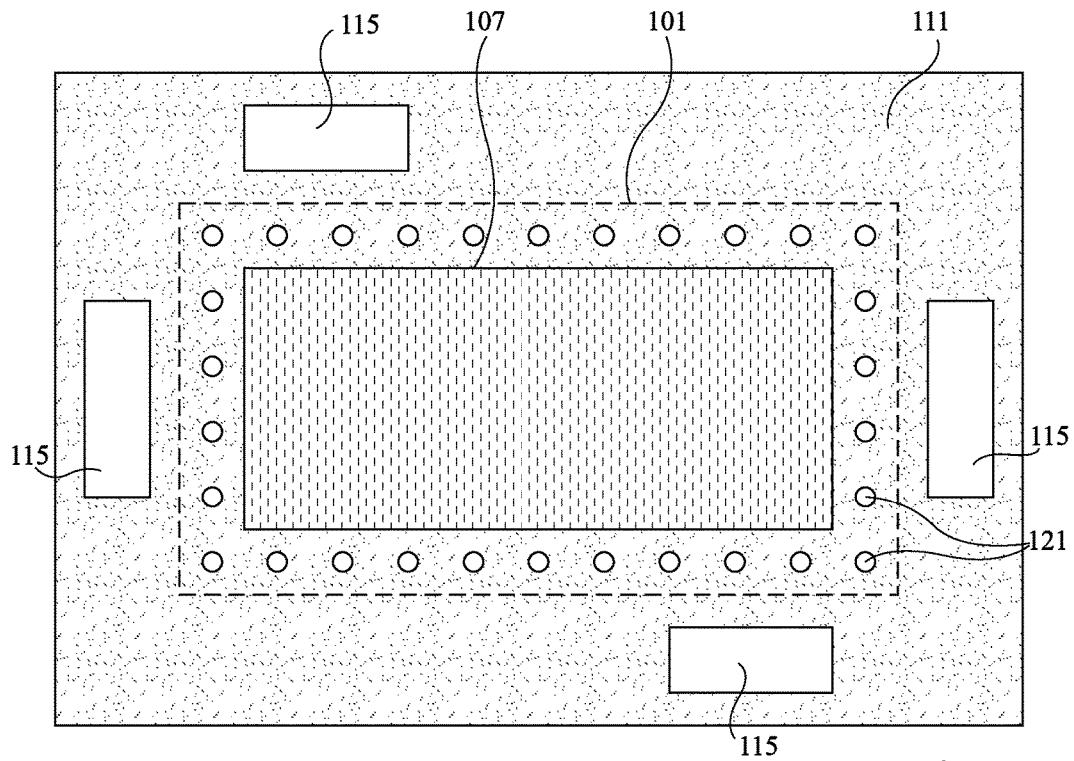
FIG. 7 is a top view of a cell unit of a fuel cell, illustrating an alternative embodiment of the method of FIGS. 4 and 5.

FIG. 7 is a top view of an elementary cell unit of a fuel cell, illustrating an alternative embodiment of the method described in relation with FIGS. 4 and 5.

The cell unit of FIG. 7 differs from the cell unit of FIGS. 4 and 5 essentially in that, in the example of FIG. 7, local area 121 of welding of frame 111 to membrane 101 does not continuously surround the active portion of the cell unit, but discontinuously surrounds it. More particularly, in the example of FIG. 7, in top view, welding area 121 is formed by a plurality of separate welding spots regularly distributed around the active portion of the cell unit. The inventors have indeed observed that, even when it is discontinuous, a local welding of frame 111 (or 113) to membrane 101 enables to significantly increase the resistance to delamination, and to limit risks of loss of tightness of the fastening between reinforcement frame 111 and membrane 101. Other discontinuous welding area patterns 121 may be provided than that shown in FIG. 7. Preferably, the distance between two separate neighboring portions of welding area 121 does not exceed 1 centimeter. Further, welding spots are preferably provided at the level of the corner regions of the cell, which are particularly subject to delamination.

Figure 8:
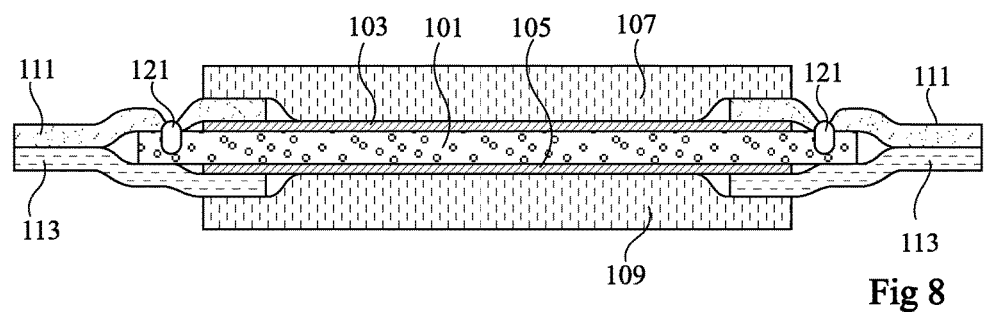
FIG. 8 is a cross-section view of a cell unit of a fuel cell, illustrating another alternative embodiment of the method of FIGS. 4 and 5.

FIG. 8 is a cross-section view of an elementary cell unit of a fuel cell, illustrating an alternative embodiment of the method described in relation with FIGS. 4 and 5. The example of FIG. 8 differs from the example of FIGS. 4 and 5 in that, in the example of FIG. 8, upper and lower reinforcement frames 111 and 113 are made of different materials. The frame having local welding 121 performed thereon, that is, frame 111 in the shown example, is made of a materials having a melting temperature lower than that of the frame undergoing no local welding, that is, frame 113 in this example. As a non-limiting example, frame 111 is made of a PET-type polymer having a melting temperature in the order of 180° C., for example, Mylar, and frame 113 is made of a polyimide having a temperature in the order of 400° C., for example, Kapton.

An advantage of the embodiment of FIG. 8 is that the presence, on the side opposite to local welding area 121, of a reinforcement frame 113 having a relatively high melting temperature, enables to perform a deep welding, which is thus particularly resistant, between frame 111 and membrane 101, without risking to pierce the stack formed by frame 111, membrane 101, and frame 113.

Figure 9:
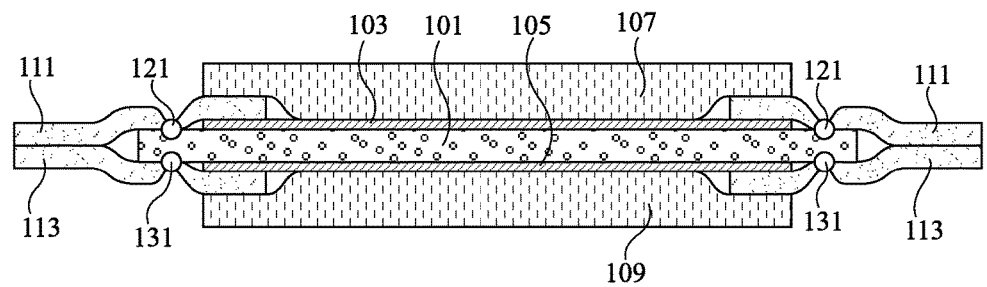
FIG. 9 is a cross-section view of a cell unit of a fuel cell, illustrating another alternative embodiment of the method of FIGS. 4 and 5.

FIG. 9 is a cross-section view of an elementary cell unit of a fuel cell, illustrating an alternative embodiment of the method described in relation with FIGS. 4 and 5. The example of FIG. 9 differs from the example of FIGS. 4 and 5 essentially in that, to further improve the resistance of cell units to cell unit delamination, a local welding 121, continuous or discontinuous, of upper reinforcement frame 111 to membrane 101, and a local welding 131, continuous or discontinuous, of reinforcement frame 113 to membrane 101 are performed. In the case where welding areas 121 and 131 are both discontinuous, the patterns of welding areas 121 and 131 are preferably complementary, that is, the welded areas of pattern 121 are opposite non-welded areas of pattern 131, and conversely. This provides particularly high-resistance cell units.

Specific embodiments have been described. Various alterations, modifications, and improvements will readily occur to those skilled in the art.

In particular, the described embodiments are not limited to the specific above-described example where the step of tight fastening of reinforcement frames 111 and 113 on membrane 110, prior to the step of local welding of at least one of frames 111 and 113 to membrane 101, is performed by hot pressing of the cell unit. As a variation, frames 111 and 113 may be fastened on or with the membrane by any other adapted means, for example, by means of a reactant-gas tight adhesive.

Further, the embodiments described in relation with FIGS. 4 to 9 are compatible with a manufacturing method of the type described in relation with FIG. 3, where catalyst layers 103 and 105 are deposited on electrodes 107 and 109, respectively, rather than on the upper and lower surfaces of membrane 101.

Further, various alternative embodiments have been described hereabove. It should be noted that those skilled in the art may combine various elements of these different variations without showing any inventive step.

The invention claimed is:

1. A method of manufacturing a cell unit of a fuel cell, comprising the steps of:
   a) forming an assembly including an electrolyte membrane, an anode catalyst layer on the side of a first surface of the membrane, a first gas diffusion electrode on the side of the anode catalyst layer opposite to the membrane, a cathode catalyst layer on the side of a second surface of the membrane opposite to the first surface, a second gas diffusion electrode on the side of the cathode catalyst layer opposite to the membrane, a first reinforcement frame arranged opposite a peripheral region of the membrane and at least partly extending between the membrane and the first electrode, and a second reinforcement frame arranged opposite said peripheral region of the membrane and at least partly extending between the membrane and the second electrode;
   b) fastening the first and second reinforcement frames on either side of the membrane; and
   c) performing a local welding of at least one of the first and second reinforcement frames with the membrane,
   wherein said welding is located in an area located opposite a portion of the peripheral region of the membrane covered with said at least one frame, and which does not extend over the entirety of said peripheral region.

2. The method of claim 1, wherein said welding is located in an area where, at the end of step b), the membrane is in contact with said at least one frame.

3. The method of claim 1, wherein said welding is located in an area where, at the end of step b), the membrane and said at least one frame are not covered with an electrode.

4. The method of claim 1, wherein said welding is located in an area continuously surrounding an active portion of the cell unit.

5. The method of claim 1, wherein said welding is located in an area discontinuously surrounding an active portion of the cell unit.

6. The method of claim 1, wherein the first and second frames are made of materials having different melting temperatures and wherein, at step c), the local welding is performed on the side of the frame having the lowest inciting temperature.

7. The method of claim 1, wherein step c) comprises a local welding of the first frame with the membrane and a local welding of the second frame with the membrane.

8. The method of claim 1, wherein step b) is carried out by hot pressing of the entire cell.

9. The method of claim 1, wherein the local welding is performed by means of a laser beam.

10. The method of claim 1, further comprising a step of cutting, by means of a laser beam, openings in portions of the first and second frames.

11. A cell unit of a fuel cell comprising an assembly comprising:
   an electrolyte membrane, an anode catalyst layer on the side of a first surface of the membrane, a first gas diffusion electrode on the side of the anode catalyst layer opposite to the membrane, a cathode catalyst layer on the side of a second surface of the membrane opposite to the first surface, a second gas diffusion electrode on the side of the cathode catalyst layer opposite to the membrane, a first reinforcement frame arranged opposite a peripheral region of the membrane and at least partly extending between the membrane and the first electrode, and a second reinforcement frame arranged opposite said peripheral region of the membrane and at least partly extending between the membrane and the second electrode, the first and second reinforcement frames being fastened on either side of the membrane; and
   a local welding of at least one of the first and second reinforcement frames with the membrane,
   wherein said welding is located in an area located opposite a portion of the peripheral region of the membrane covered with said at least one frame, and which does not extend over the entirety of said peripheral region.

12. The cell unit of claim 11, wherein said local welding continuously surrounds an active portion of the cell unit.

13. The cell unit of claim 11, wherein said local welding discontinuously surrounds an active portion of the cell unit.

* * * * *